United States Patent Office 2,904,998
Patented Sept. 22, 1959

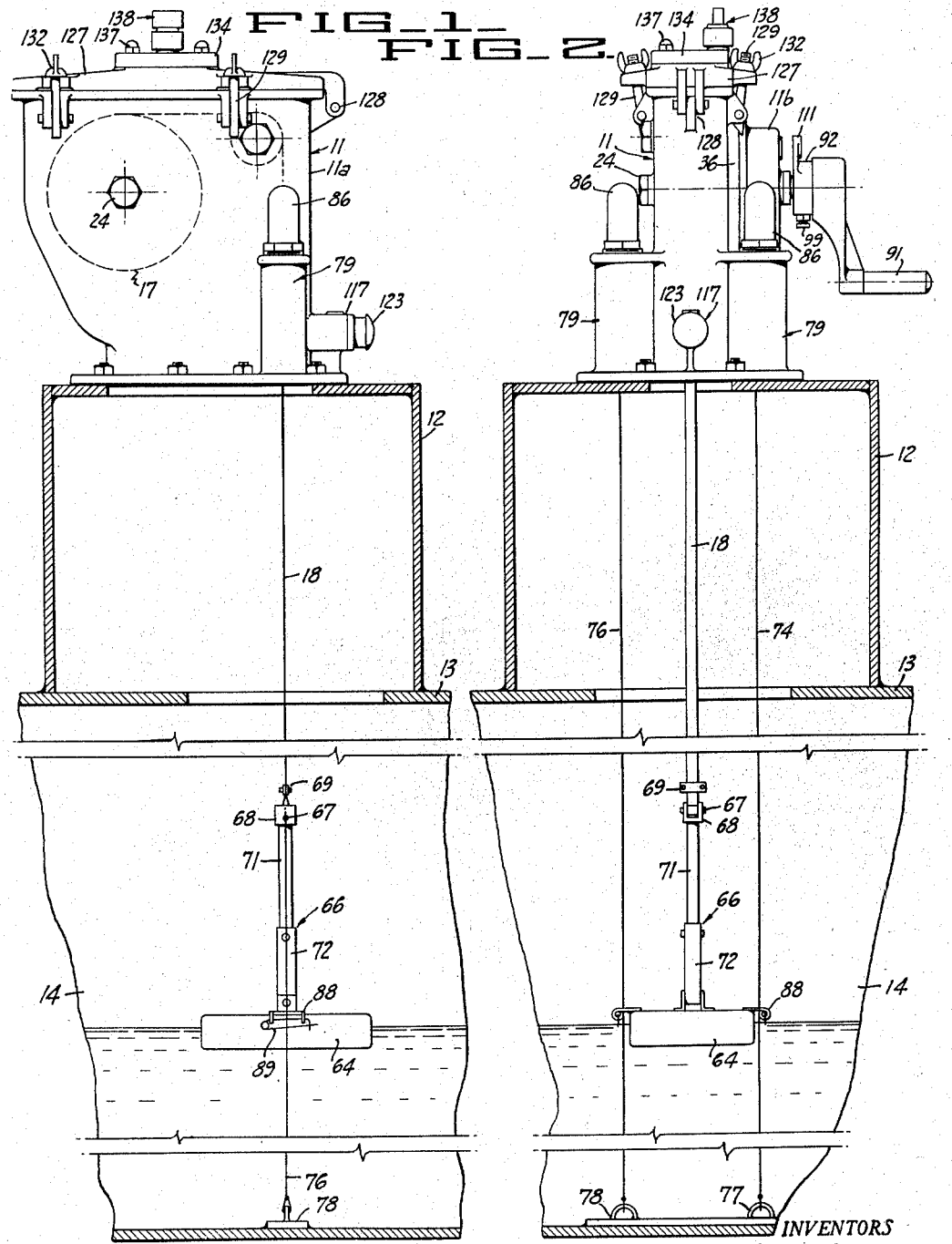

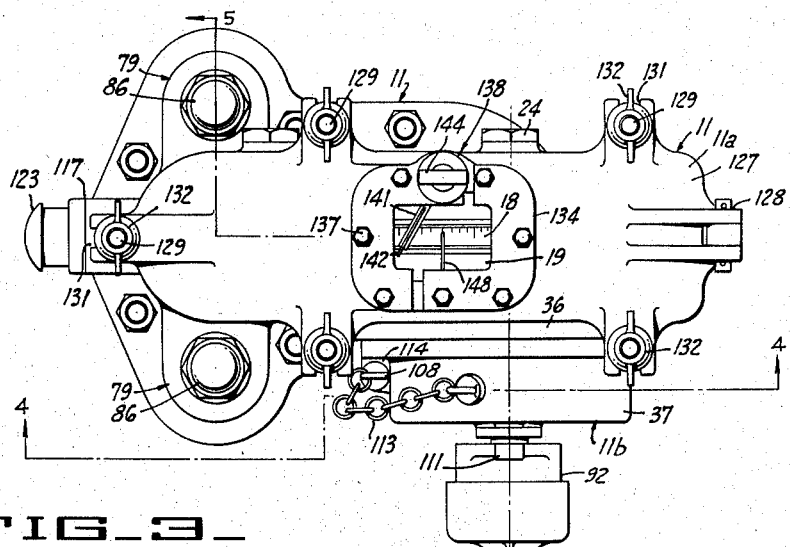
FIG_3_
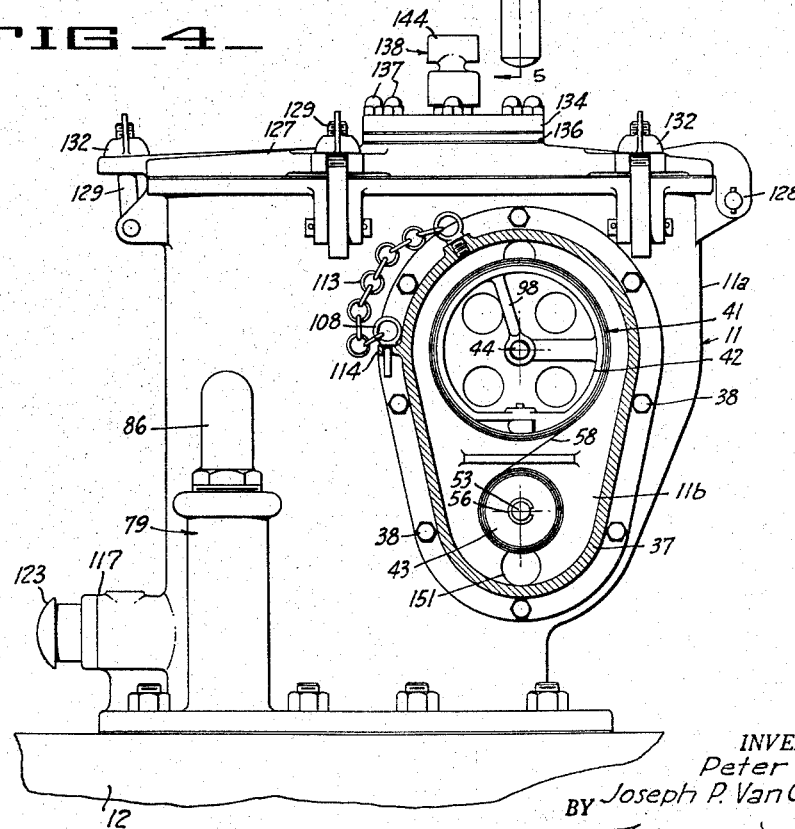
FIG_4_
INVENTORS
Peter C. Jurs
Joseph P. Van Overveen
BY
ATTORNEYS

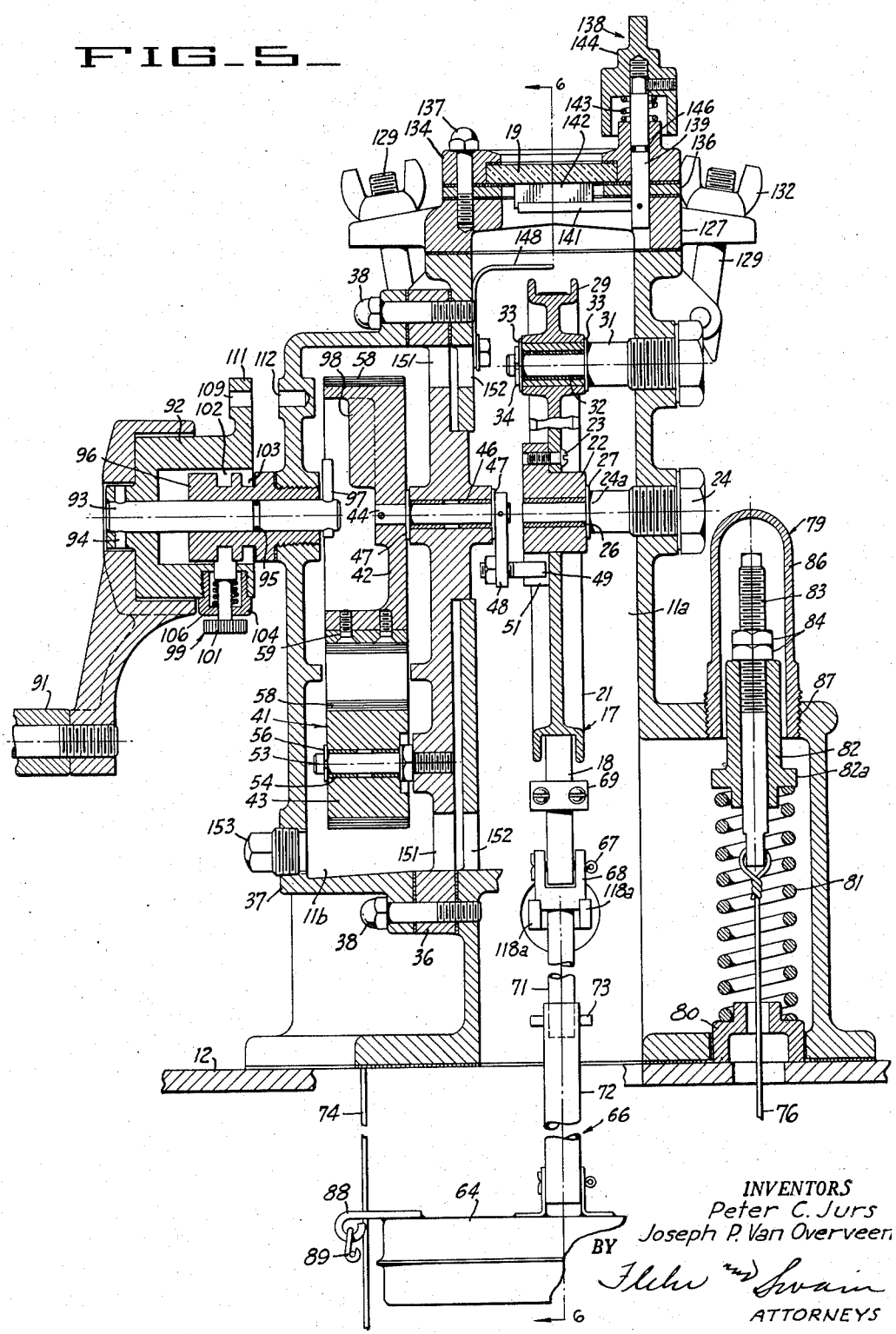

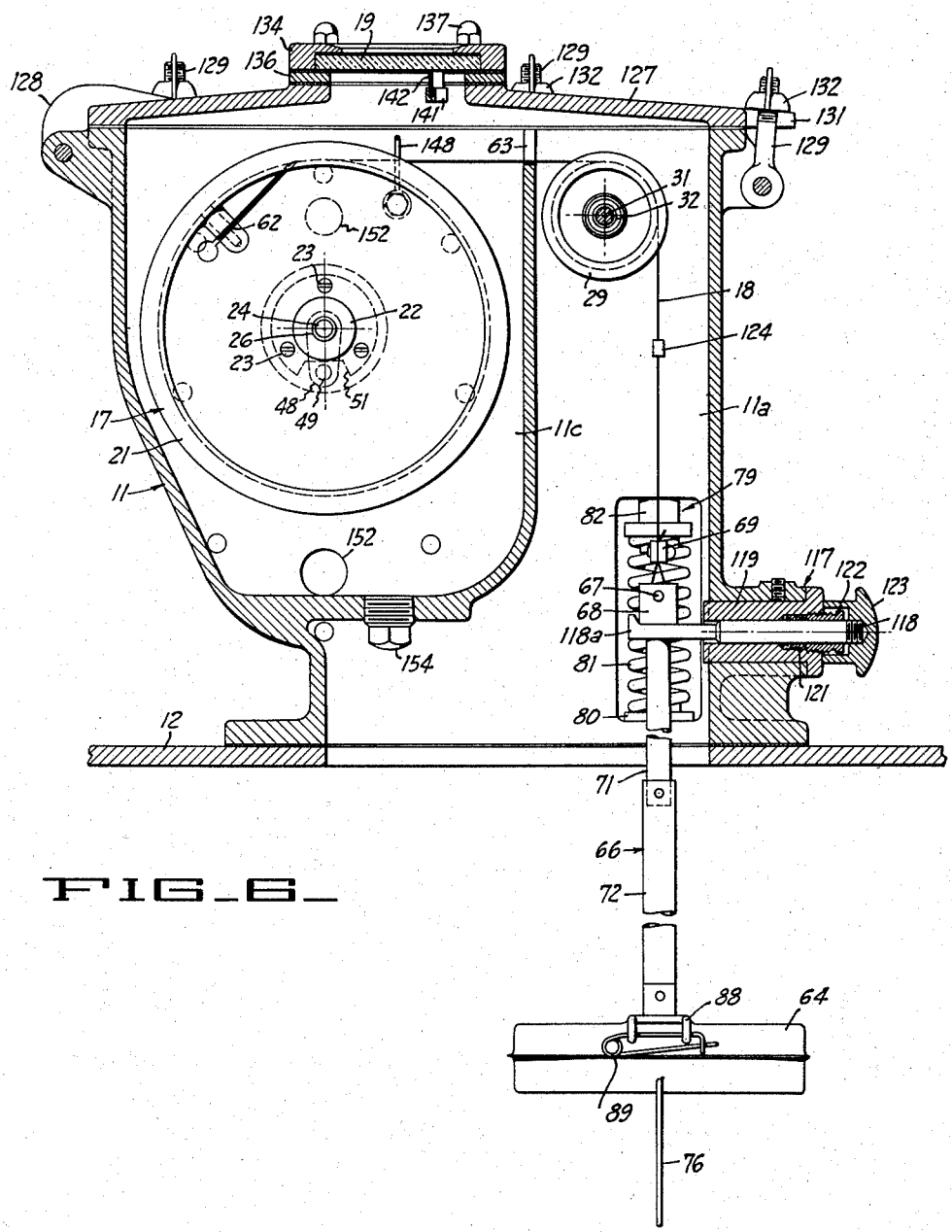
FIG_6_

2,904,998
LIQUID LEVEL GAUGING APPARATUS

Peter C. Jurs, Oakland, and Joseph P. Van Overveen, Lafayette, Calif., assignors to Shand and Jurs Co., Berkeley, Calif., a corporation of California Application October 1, 1956, Serial No. 612,992

2 Claims. (Cl. 73—321)

This invention relates generally to gauging apparatus and more particularly to liquid level gauging apparatus adapted for marine use.

In the operation of seagoing vessels, it is generally desirable to provide level gauging apparatus for measuring the liquid level in tanks or compartments on the vessels. However, in certain marine applications such as on oil tankers, the level gauging apparatus is only required during loading and unloading of the vessel and is not normally used during the long voyages which occur between loading and unloading. For that reason it is desirable to provide means whereby the tape and tape drum may be removed from the gauging apparatus when not in use and stored to prevent undue wear to the apparatus and to prevent possible chemical attack by the liquid being transported. Since seagoing vessels often operate in extremes of climate, means must be provided so that the gauging apparatus is operable under all possible temperature conditions.

In general, it is an object of the present invention to provide an improved level gauging apparatus which is particularly adapted for marine use.

Another object of the invention is to provide level gauging apparatus of the above character in which the major operating parts are readily accessible and in which certain parts are readily removable.

Another object of the invention is to provide level gauging apparatus of the above character which is adapted for operation in extremes of climate.

Another object of the invention is to provide a gauging apparatus of the above character in which parts may be removed with a minimum amount of vapor evaporation.

Another object of the invention is to provide level gauging apparatus of the above character in which the accuracy of gauging is increased.

Another object of the invention is to provide level gauging apparatus of the above character in which the accuracy of gauging is not affected by removal of the tape.

Additional objects and features of the invention will appear from the following description in which the preferred embodiment has been set forth in detail in conjunction with the accompanying drawings.

Referring to the drawings:

Figure 1 is a side elevational view illustrating level gauging apparatus incorporating the present invention installed in connection with the compartment or tank below the deck of a ship.

Figure 2 is a front elevational view of the apparatus shown in Figure 1.

Figure 3 is a top plan view of the apparatus shown in Figures 1 and 2.

Figure 4 is a cross sectional view taken along the line 4—4 of Figure 3.

Figure 5 is an enlarged cross sectional view taken along the line 5—5 of Figure 3.

Figure 6 is a reduced cross sectional view taken along the line 6—6 of Figure 5.

The level gauging apparatus illustrated in the drawing consists of a housing 11 which is adapted to be mounted upon an enclosure 12. The enclosure 12 is fixed to the portion of the deck 13 of a ship overlies a storage compartment or tank 14. The housing 11 serves to carry reeling means 17 which engages a metal gauging tape 18 or like elongate flexible gauging element. Graduations upon the tape 18 may be read through the window 19.

The reeling means for the tape includes a reel 21 of a suitable material such as metal or a thermosetting plastic. The reel is mounted on a hub 22 by suitable means such as screws 23. The hub 22 is rotatably carried on a stud shaft 24 which is threaded into the housing 11. A suitable low friction and corrosion resistant bearing surface 26 such as one of "Teflon" is provided in the hub 22. A washer 27 of similar material is mounted between the hub 22 and a collar portion 24a of the stud shaft 24.

An idler pulley 29 is similarly mounted and is also formed of a suitable material such as plastic. The idler pulley 29 is rotatably carried by a stud shaft 31 and is provided with a Teflon bearing surface 32 and washers 33. The idler pulley is held in place by suitable means such as a split retaining ring 34.

It will be noted that the housing 11 consists of two sections 11a and 11b. Section 11a is provided with a separate compartment 11c which substantially encloses the reel 21. Section 11b is formed in two parts, an intermediate plate or mounting base 36 and a cover plate 37 which are detachably fixed to one side of the housing 11 by suitable means such as cap screws 38.

Counterbalancing means in the form of a negative spring assembly 41 is mounted within the section 11b of the housing. The negative spring assembly consists of a power drum 42 and a storage drum 43. The power drum is fixed to a shaft 44 journalled into the mounting base 36. A Teflon bearing surface 46 is provide in base 36 and washers 47 are provided for the shaft 44. The other end of the shaft 44 is connected to the reel 17 by suitable coupling means such as a crank arm 48 on which is mounted a pin 49 adapted to engage a slot 51 in the hub 22.

The storage drum 43 is rotatably carried by a stud shaft 53 threaded into the base plate 36. A suitable bearing surface 54 and retaining ring 56 are provided.

A negative spring 58 such as that type manufactured by the Hunter Spring Co. of Lansdale, Pennsylvania, has one end connected to the power drum 42 by suitable means such as screws 59 and its other end wrapped onto the storage drum 43. The negative spring is a pre-stressed coil component which has a tendency to wind itself onto the storage drum 43 and as a result provides a variable torque on the motor drum 42 for a purpose hereinafter described.

The gauging tape 18 has one end fixed to the reel 21 at 62 and extends through an opening 63 in the housing 11. The tape 18 is looped over the idler pulley 29 and is connected to a float 64 by suitable means such as a float neck assembly 66. As shown in the drawing, the lower end of the tape is looped over a pin 67 in a block 68 and the free end of the tape is fixed to the tape 18 by a clamp 69. The block 68 is fastened to a pipe 71 which is connected to a tubular extension 72 mounted on the float 64. A pin 73 is mounted in the extension 72 for a purpose hereinafter described.

The float 64 is guided in its vertical movement by wires 74 and 76 which are fastened to the bottom of the tank or compartment 14 at 77 and 78. The guide wires 74 and 76 are maintained under tension by suitable means such as the tensioning assemblies 79 shown in the drawing. Each of the tensioning assemblies consists of a spring base 80 which loosely rests in an opening in the housing 11 and rests on the enclosure 12. A coil spring 81 is mounted on the spring base 80 and holds the spring base in place. The upper end of the spring is engaged by a member 82 provided with a flanged portion 82a.

An adjusting screw 83 has one end connected to the associated guide wire which in this case is guide wire 76 and is slidably mounted in member 82 and held in position by nuts 84. It is evident that by means of the nuts 84, the tension on the guide wire 76 can be properly adjusted. A cap 86 is threaded into the housing 11 and serves to enclose the upper portion of the tensioning assembly and permits easy access to the tensioning assembly whenever adjustment of the guide wires is required. Since the spring base 80 is not fixed to the housing 11, the housing 11 may be lifted off the enclosure 12 without disturbing the tensioning assemblies 79.

The guide wire tensioning assemblies are constructed in such a manner that the guide wires may be replaced without removing or shifting the housing 11. The guide member 82 and the spring 81 may be readily removed throuugh the threaded bore 87 after removal of the cap 86. The spring base or support 80 is provided with a slot (not shown) whereby it may be slid off from the side of the guide wire 76 to permit the screws 83 to drop downwardly into the compartment 14.

Suitable means is provided on the float 64 for engaging the guide wires 74 and 76 and consists of spaced apart eyelet members 88 between which the guide wires are adapted to extend. A safety pin 89 extends between the eyelet members 88 and thus permits only restricted horizontal movement of the float 64.

Suitable drive means is provided for raising the float 64 and consists of a crank 91 which is provided with a squared recess that is adapted to fit over the squared end of a clutch member 92. The crank may be readily removed when not in use. The clutch member 92 is mounted on the external end of a shaft 93 and is fixed thereto by a pin 94. The shaft 93 is slidably and rotatably mounted in a bushing 96 which is threaded into the cap 37. Suitable sealing means such as an O-ring 95 can be provided between the shaft and the bushing. A pin 97 is provided on the inner end of the shaft 93 and is adapted to engage a rib 98 which is an integral part of the power drum 42, to provide coupling means between shafts 44 and 93.

A lock pin assembly 99 is mounted on the clutch member 92 and consists of a lock pin 101 which is adapted to engage either grooves 102 or 103 provided on the outer surface of the bushing 96. The lock pin 101 is slidably mounted in a retaining member 104 threaded into the clutch member 92. A spring 106 is mounted on the lock pin 101 and serves to continuously urge the lock pin into engagement with the bushing 96.

When the lock pin 101 is in the outer groove 102 as shown in Figure 5, the pin 97 is not in engagement with the power drum 42 and thus no friction is encountered during a gauging operation. As soon as the pin 101 is lifted and the crank 91 is pushed inwardly so that the pin 101 engages groove 103, the pin 97 will be adapted to engage the rib 98 on the power drum 42. Rotation of the crank 91 will cause the tape 18 to be reeled onto or off of the reel 21. A crank lock pin 108 is provided (Figure 4) and is adapted to be inserted in a hole 109 in an extension 111 of the clutch member 92. When the hole 109 is in registration with a hole 112 in the cover plate 37, the crank lock pin 108 can be inserted to lock the gauging apparatus in a predetermined position. The lock pin 108 is fastened to the cover plate 37 by chain 113. A mounting lug 114 is provided on the cover plate 37 for receiving the lock pin when it is not needed.

A float hanger assembly 117 is mounted on the housing 11 and consists of a float hanger 118 having a pair of forked extensions 118a adapted to engage the block 68 as shown in Figures 5 and 6. The float hanger is slidably mounted in a guide bushing 119 mounted in the housing 11. A suitable packing 121 is held in place by gland 122 threaded into the bushing 119. A handle 123 is threaded onto the end of the float hanger 118.

A clamp 124 has been mounted on the gauging tape 18 a slight distance above the block 68. When this clamp 124 engages the idler pulley 29 a slight jar will be felt serving to indicate that most of the gauging tape has been wound onto the heel 21. This serves to notify the operator that he should stop cranking. The clamp 124 will not pass through the opening 63 and thus will prevent winding of the tape when the clamp 124 reaches this point. This prevents the operator from bringing the block 68 into violent engagement with the idler pulley 29 and thus prevents damage to the pulley 29.

As soon as the block 68 has been raised to a position above the float hanger assembly 117, the float hanger 118 may be moved inwardly so that it will engage the block 68 to support the float 64 for a purpose hereinafter described.

The housing 11 includes a main cover 127 which is hinged to one side of the housing at 128. The cover closes an opening which is dimensioned to pass the reel 17. The main cover is adapted to be secured to the housing by drop bolts 129 which are pivotally connected to the housing and are adapted to extend through slots 131 in the main cover 127 and be secured thereto by wing nuts 132.

The window 19 for viewing the horizontal run on the gauging tape 18 is mounted on the main cover 127. The mounting means illustrated for this purpose consists of a window structure 134 which engages the upper outer margin of the window 19 and a spacer 136 which engages the lower outer margin of the window 19. The window structure 134 and the spacer 136 are secured to the main cover 127 by suitable means such as cap screws 137.

A wiping assembly 138 is provided for the window 19 and consists of a wiper shaft 139 which is rotatably mounted in the window structure 134. A wiper arm 141 is fixed to the lower end of the wiper shaft 139 and carries a flexible blade-like member 142 adapted to engage the lower surface of the window 19. A spring 143 is mounted on the upper end of the shaft 139 and engages a handle 144 which is threaded onto the upper portion of the shaft 139. An O-ring 146 mounted on the shaft 139 forms a suitable vapor-tight seal.

It is apparent that by rotation of the handle 144 the wiper blade 142 can be moved back and forth across the lower surface of the window 19 to remove condensate and the like.

A pointer 148 is mounted on the inner side wall of the housing 11 and overlies the gauging tape 18 at a point where it may be viewed through the window 19.

Compartments 11b and 11c of the housing 11 are interconnected by openings 151 and 152. Both compartments are adapted to be filled with a suitable anti-freeze to prevent the collection of condensate and freezing thereof on the moving parts. A drain plug 153 is provided for removing the anti-freeze from both compartments 11b and 11c. Another drain plug 154 is provided in compartment 11c to permit draining of both compartments in that direction if desired.

It will be noted that gaskets have been provided at the required places to make the gauging apparatus a vapor-tight unit.

The gauging apparatus above described operates as follows: It is assumed that the apparatus is installed upon the deck of a vessel as illustrated in Figures 1 and 2. When the operator wishes to lower the gauging tape 18 and the float 64 connected thereto from the position shown in Figure 6, the operator pulls out the lock pin 101 from the position shown in Figure 5 and pushes the clutch member 92 inwardly until the lock pin 101 engages groove 103 so that the pin 97 is adapted to engage the rib 98.

The crank 91 is then placed on the clutch member 92 and operated to lift the float 64 a slight distance and then the float hanger 118 is retracted so that it will no longer engage the block 68. The crank is then rotated to unreel the tape and lower the float 64. This is continued until the float is lowered upon the liquid in the tank. The lowering is accomplished against the action of the negative spring 58. As explained previously, the negative spring applies a constant torque to the motor drum 42 which tries to lift the float 64 from the liquid. The force applied by the negative spring to the gauging tape 18 is such that the float 64 always rests at a predetermined level in the liquid. The negative spring 58 also serves to automatically compensate for the increased length of tape reeled out by applying more torque to the power drum 42.

After the gauging tape 18 and the float 64 have been lowered, the lock pin 101 is again pulled out and the handle pulled outwardly until the lock pin engages the outer groove 102. In this position, the pin 97 no longer engages the rib 98. Thus, no forces are applied by the pin 97 to the power drum 42 to affect the accuracy of the gauging assembly. The tape is read by reading the tape through the window 19 at a point immediately below the pointer 148. The horizontal run of the tape 18 immediately below the window 19 serves to prevent errors in reading.

When the operator desires to raise the tape 18 and the float 64, the pin 97 is again brought into engagement with the rib 98 and the handle is operated to gradually raise the tape 18. When the graduations on the tape indicate that nearly all of the tape has been reeled in, the operator raises the float 64 a slight additional distance and the float hanger 118 is pushed inwardly so that the forked portions 118a are adapted to engage the pin 73. The crank 91 may then be released to lower the pin 73 onto the float hanger 118.

When no further gauging is required such as on a vessel which is going on a long voyage, the operator may wish to remove the gauging tape 18 and the reel 21 to prevent undue wear to the gauging tape and other moving parts. Hole 109 in the clutch member 92 is brought into registration with the hole 112 in the housing 11 by rotation of the crank 91. The crank lock pin 108 is then inserted in the holes 109 and 112 and serves to lock the negative spring assembly from further rotation. The main cover 127 is then opened by loosening the wing nuts 132 and swinging the drop bolts 129 to out-of-the-way positions. The main cover 127 is then swung open and the pin 67 fastening the tape 18 to the block 68 is removed. The stud shaft 24 rotatably carrying the reel 21 is then unscrewed from the housing 11 and removed after which the reel 21 and the tape 18 may be removed through the main cover opening. Pin 67 and stud shaft 24 are replaced and the main cover 127 is secured. The reel 21 and the tape wound thereon may then be stored in a suitable place until required for the next gauging operation.

From the foregoing it is apparent that the construction herein disclosed is particularly advantageous in that it permits rapid removal of the reel and the tape with negligible evaporation of vapors from the storage compartment.

The float 64 will be held within the enclosure 12 and will not fall off during movement of the vessel because of the construction of the forked portions 118a of the float hanger 118.

The construction of our gauging apparatus also facilitates access to the major operating parts. After opening the main cover 127 the gauging tape 18, the tape reel 21 and the idler pulley 29 are readily accessible. The negative spring assembly is easily accessible by removal of the cover plate 37. The intermediate or base plate 36 is also readily removable to permit access to other moving parts of the apparatus.

It will be evident from the foregoing that we have provided a new and improved gauging apparatus which is particularly adapted for marine applications. Certain parts are readily removable for storage to minimize wear to the moving parts. All of the major operating parts are readily accessible to facilitate repair and maintenance. In addition, with the present gauging apparatus, greater accuracy is possible due to the elimination of a counterweight which is used in many similar devices. The negative spring assembly serves to take the place of the counterweight and at the same time apply the more or less torque to the tape reel in accordance with the length of the gauging tape played out.

We claim:

1. In a liquid level gauging apparatus, a housing formed in first and second sections, a stud shaft removably mounted in one side wall of the first section of the housing, a reel rotatably carried by the stud shaft, an elongated flexible element wound on said reel and adapted to extend downwardly, a float secured to the lower end of said element, a shaft rotatably mounted in the second section of said housing, counterbalancing means mounted in said second section and serving to apply counterbalancing torque to said second shaft, coupling means for connecting said second shaft to said reel unit whereby upon rotation of said second shaft said reel unit is rotated, and drive means carried by the second section of the housing for rotating said second shaft, said first section of the housing having one wall adapted to be opened to provide an opening dimensioned to pass the reel whereby when the reel and the elongated element wound thereon are lifted through said opening said coupling means connecting said second shaft to said reel is automatically disconnected.

2. Apparatus as in claim 1 wherein said drive means includes a third shaft rotatably mounted in the second section of said housing, means for coupling said third shaft to said second shaft, and an operating handle for rotating said third shaft.

References Cited in the file of this patent

UNITED STATES PATENTS

| | | |
|---|---|---|
| 1,483,131 | Tausey et al. | Feb. 2, 1924 |
| 2,265,736 | Larson | Dec. 7, 1941 |
| 2,811,039 | Hein | Oct. 29, 1957 |

FOREIGN PATENTS

| | | |
|---|---|---|
| 594,332 | Germany | Mar. 15, 1934 |
| 1,112,524 | France | Nov. 16, 1955 |